(No Model.)

J. H. HAMILL.
FOUNTAIN ATTACHMENT FOR INKSTANDS.

No. 471,002. Patented Mar. 15, 1892.

WITNESSES:
F. McArdle.
C. Sedgwick

INVENTOR
J. H. Hamill
BY Munn & Co
ATTORNEYS.

UNITED STATES PATENT OFFICE.

JOSEPH H. HAMILL, OF GLOBE, ARIZONA TERRITORY.

FOUNTAIN ATTACHMENT FOR INKSTANDS.

SPECIFICATION forming part of Letters Patent No. 471,002, dated March 15, 1892.

Application filed July 28, 1891. Serial No. 400,960. (No model.)

*To all whom it may concern:*

Be it known that I, JOSEPH H. HAMILL, of Globe, in the county of Gila and Territory of Arizona, have invented a new and Improved Fountain Attachment for Inkstands, of which the following is a full, clear, and exact description.

My invention relates to a fountain attachment for ink stands or wells, and has for its object to provide an attachment capable of being expeditiously and conveniently applied to make accessible the ink of any inkstand or ink-well and to so construct the attachment that it will be simple, durable, and economic.

A further object of the invention is to provide a means whereby the receptacle or mouth-piece from which the ink is taken by a pen will serve also as a cap to prevent dust or foreign matter from entering the interior of the stand or well to which the attachment is applied.

The invention consists in the novel construction and combination of the several parts, as will be hereinafter fully set forth, and pointed out in the claims.

Reference is to be had to the accompanying drawings, forming a part of this specification, in which similar figures and letters of reference indicate corresponding parts in all the views.

Figure 1:
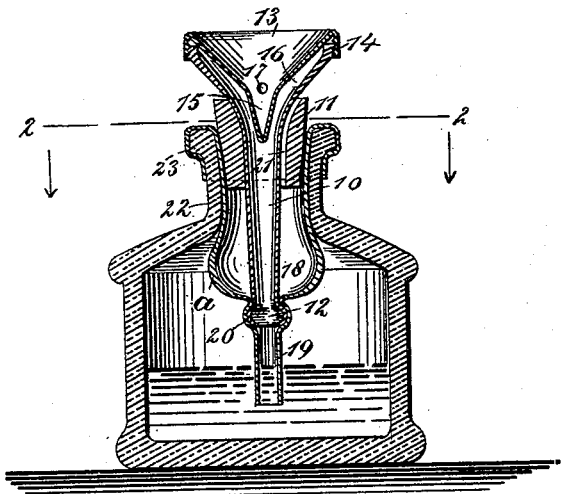
Figure 2:
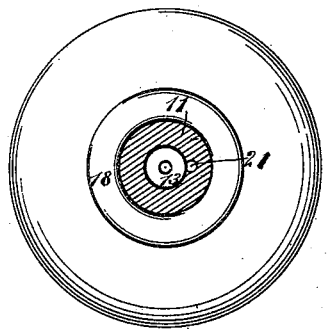

Figure 1 is a central vertical section through an inkstand having the invention applied thereto. Fig. 2 is a horizontal section taken, practically, on the line 2 2 of Fig. 1; and Fig. 3 is a side elevation of what I denominate the "sack-section" of the attachment.

In carrying out the invention a funnel 10 is fitted in a stopper 11 or the eqvivalent thereof, extending above and below it. The lower end of the funnel is ribbed or otherwise enlarged, as shown at 12 in Fig. 1, and the upper end of the funnel is either interiorly or exteriorly threaded to receive a mouth-piece 13. The mouth-piece and the funnel are preferably made of hard rubber or a like material, metal being used, if preferred. The mouth-piece is provided with a marginal flange 14, threaded to screw upon the threaded surface of the funnel. The mouth-piece is practically in the shape of an inverted cone, the lower portion whereof constitutes virtually a well 15, adapted to gather and contain any sediment or foreign matter which may become mixed with the ink when in the mouth-piece. The mouth-piece is of less diameter than the diameter of the funnel, thus producing an annular space or chamber 16 between their upper walls, as is best shown in Fig. 1, and ink is admitted from the funnel into the mouth-piece through the medium of apertures 17, which apertures are produced in the walls of the mouth-piece just above the well, as is likewise best shown in Fig. 1.

Figure 3:
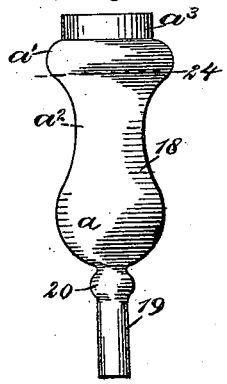

In connection with the funnel and the mouth-piece a sack 18 is employed, which is shown in detail in Fig. 3, and is constructed of a flexible or yielding material, such as sheet-rubber. The body of the sack, at its lower end, is preferably cylindric, as illustrated at $a$ in Fig. 3, and the sack is thickest at the side walls of this section. Near the upper end of the sack an enlarged section $a'$ is formed, also cylindric in general contour, and that portion of the body between the sections $a$ and $a'$ is somewhat contracted, as illustrated at $a^2$ in Fig. 3. The upper end of the sack is circular and is reduced, forming, practically, a flange $a^3$, and integral with the lower end of the sack a tube 19 is constructed, which tube at its junction with the body is enlarged to receive the enlarged end 12 of the funnel, which enlarged end is adapted to pass through the body of the sack and enter the enlargement 20 of the tube, the contour of the tube enlargement corresponding to that of the funnel enlargement, as is illustrated in Fig. 1.

The cork or stopper 11 is provided at one side of the funnel with an air-vent 21.

In applying the attachment to an ink stand or well the neck 22 of the inkstand is preferably provided with an exterior rib 23. The attachment having been put together, which is accomplished by screwing the mouth-piece upon the upper end of the funnel, passing the funnel down through its stopper, and the stopper and funnel into the sack, the lower end of the funnel, as heretofore stated, entering the sack-tube 19, the attachment is then inserted in the mouth of the bottle or well and the upper end of the sack upon the dotted line 24 is bent downward over the rib 23 of the neck and the surface beneath said rib, as is shown in Fig. 1.

In the operation of the device to raise the ink from the bottle into the mouth-piece the funnel is drawn upward, carrying thereby the lower section of the sack with it, and when the funnel is forced downward again into the bottle the air above the ink will be so compressed as to force the liquid up through the tube 19 of the sack into the funnel, from whence it will find its way through the apertures 17 into the mouth-piece, into which the pen is to be dipped.

It will be observed that by thickening the walls of the sack at the lower portion of its body, when the said lower end of the body is drawn upward and slightly pressed downward, the enlarged portions of the walls will act as a spring to quickly force the sack to its normal position, and thus readily send a column of ink upward. It will be further observed that the attachment is exceedingly simple, durable, and economic and that it may be conveniently and expeditiously applied to any ink stand or well, and, further, that the mouth-piece will effectually prevent any foreign matter from entering the stand or well and that each and every part of the attachment may be readily disconnected and thoroughly cleaned when occasion may demand.

Having thus described my invention, I claim as new and desire to secure by Letters Patent—

1. A fountain attachment for inkstands, comprising a sack adapted for attachment to a stand or well and constructed of an elastic yielding material, a funnel of a hard material having its lower end attached within the sack, and an apertured mouth-piece connected with the upper end of the funnel and covering the same, as and for the purpose specified.

2. A fountain attachment for inkstands, consisting of a sack of an elastic material, the upper end of which sack is adapted to be bent over upon the mouth of an ink stand or well, a funnel of a hard material, the lower end of which is connected with the interior of the sack at the bottom thereof, and a mouth-piece shaped as an inverted cone and provided with a series of apertures in its side walls, the said mouth-piece being removably attached to the upper end of the funnel and covering said funnel, as and for the purpose specified.

3. A fountain attachment for inkstands, consisting of an elastic sack the upper end of which is adapted to be bent over upon itself, the lower end being provided with a pendent tube having communication with the body of the sack, a stopper fitted within the mouth of the sack and provided with a vent-opening, a funnel passed through the said stopper, the lower end of which is enlarged and is in frictional engagement with the pendent tube of the sack, and a mouth-piece of less diameter than the upper end of the funnel, shaped as an inverted cone, and provided with a series of apertures, the said mouth-piece being attached to the upper end of the funnel and covering the same, as and for the purpose set forth.

4. As an improved article of manufacture, a fountain attachment for inkstands, consisting of a flexible sack, a funnel having an enlarged lower end passed through the sack and yet connected therewith, and a mouth-piece shaped as an inverted cone and attached to the upper end of the funnel, covering said end, as and for the purpose set forth.

5. In a fountain attachment for inkstands, a funnel and a cap shaped as an inverted cone and having apertured walls, the said cap being of less diameter than the upper end of the funnel and removably attached thereto, covering said upper end, as and for the purpose specified.

6. In a fountain attachment for inkstands, the combination of a flexible sack depending into the bottle and a funnel projecting through the sack and having an enlargement below the same, substantially as described.

JOSEPH H. HAMILL.

Witnesses:
G. M. ALLISON,
FRANK D. JOHNSON.